United States Patent Office 2,834,782
Patented May 13, 1958

2,834,782

MONOCALCIUM MONOPIPERAZINE SALT OF ETHYLENEDIAMINETETRACETIC ACID

Albert Schlesinger, Jackson Heights, Karl Schoen, Kew Gardens, and Samuel M. Gordon, Forest Hills, N. Y., assignors to Endo Laboratories, Inc., Richmond Hill, N. Y., a corporation of New York No Drawing. Application July 14, 1955
Serial No. 522,172

11 Claims. (Cl. 260—268)

This invention relates to piperazine. In particular it is directed to a novel salt of piperazine; and methods of manufacturing the same.

Piperazine and the salts thereof, are used as vermifuges and vermicides against intestinal parasites such as pinworms and roundworms in humans and animals. The common salts of piperazine, as for example, the citrate and hydrochloride, are hygroscopic and deliquescent in contact with the atmosphere. Other salts, such as the salicylate and adipate, are insoluble in water. The citrate, moreover, when taken in the large amounts required for combatting particular roundworms, has a laxative action.

We have discovered that it is possible to provide a stable, water-soluble, non-hygroscopic salt of piperazine which has excellent vermicidal action; is well tolerated by humans and animals; and has a pleasant taste.

Accordingly, it is one of the principal objects of this invention to provide a stable, water-soluble, non-hygroscopic salt of piperazine which is characterized by excellent vermicidal action; is well tolerated by humans and animals; and has a pleasant taste.

It has been found that such desirable characteristics in a salt of piperazine are provided by a double salt of piperazine and calcium characterized by the fact that the calcium is available in soluble, readily-assimilable form.

Such feature is especially of value for growing children who are most often afflicted with intestinal parasites.

Accordingly, it is another object of this invention to provide a double salt of piperazine and calcium wherein the calcium is available in soluble, readily-assimilable form.

Further objects and advantages of this invention will become apparent from the following, detailed description thereof.

The novel salt of this invention is piperazine calcium ethylenediaminetetraacetate, having the following formula:

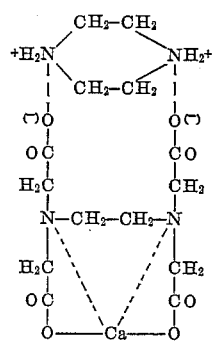

The novel salt having the formula above set forth is prepared by dissolving equimolar amounts of piperazine, or piperazine hexahydrate, ethylenediaminetetraacetic acid and a calcium compound such as calcium carbonate, calcium hydroxide, calcium oxide or calcium metal in a small amount of water. On the addition of excess ethanol to the solution, the salt precipitates as a white, sticky mass which crystallizes upon standing.

Another simple method of obtaining the salt from an aqueous solution thereof, is by evaporation of the water of the solution on a steam bath or in an oven.

When dried to constant weight at 80° C, the new salt of this invention has the formula:

$$C_{14}H_{24}N_4O_8Ca \cdot 2H_2O$$

and mol. weight 452.47.

The analytical figures found on assay are:

Nitrogen: Calc. 12.38%, found 12.44, 12.43%.
Calcium: Calc. 8.86%, found 8.82, 8.81%.

The water of crystallization is lost when the salt is heated for 24 hours, at 105°–110° C.

Piperazine calcium ethylenediaminetetraacetate is very soluble in water. A 20% aqueous solution thereof is colorless and has a pH of 5.3. The salt is also soluble in glycerol and propylene glycol and insoluble in alcohols, such as methanol, ethanol, propanol, and in acetone. Upon heating, the salt gradually undergoes decomposition above 185° C. without melting.

Feeding tests on animals have shown that the salt of this invention is very well tolerated. Tests on humans, both children and adults, have shown that the salt is effective in combatting intestinal worms; and is very well tolerated without causing nausea or diarrhea.

The following examples are illustrative of the invention.

Example 1

190 gms. of piperazine hexahydrate and 292 gms. of ethylenediaminetetraacetic acid were stirred in 350 ml. of water until dissolved. To that solution there was gradually added, in small portions and with continuous stirring, 100 gms. of calcium carbonate. Each addition of the calcium carbonate was made after a previous portion had reached completely in order to avoid overflowing of the foaming liquid. During the addition of the calcium carbonate, gaseous carbon dioxide is liberated which escapes and causes foaming of the liquid.

A clear solution was thus obtained which was filtered through paper and then poured with vigorous stirring into 2600 ml. of anhydrous ethanol. The salt precipitated as a sticky mass which crystallized within 1 hr.

It was broken up into small pieces, filtered, washed with anhydrous ethanol and dried in an oven at 80° C. The yield was quantitative.

Example 2

A solution of the new salt was prepared in accordance with the procedure described in Example 1. The solution was evaporated on a steam bath to a thick, semi-solid mass, which solidified completely upon cooling. The salt was passed through a coarse sieve and dried in an oven at 85° C. It was then ground up to a fine powder and dried completely at 105° C.

Example 3

190 gms. of piperazine hexahydrate and 292 gms. of ethylenediaminetetraacetic acid were dissolved in 350 ml. of water; and 75.1 gms. of calcium hydroxide were added thereto with stirring. A clear solution was obtained from which the piperazine calcium ethylenediaminetetraacetate was isolated in accordance with the procedure described in Example 2.

Example 4

525 gms. of piperazine hexahydrate, 9.0 gms. of methylparaben and 1.0 gms. of propylparaben were dissolved in 2.2 liter of distilled water by stirring at room temperature. To that solution there were added 750 gms. of ethylenediaminetetraacetic acid, followed by the addition of 271 gms. of calcium carbonate in small portions with good stirring in order to prevent the liquid from foaming over the top of the vessel.

To the solution thus obtained there were added 1500 gms. of sucrose, food, drug and cosmetic color, and raspberry flavor. Water was then added to produce a final volume of 5 liters. The product thus obtained was a palatable syrup containing in each 1 ml. the equivalent of 100 mg. of piperazine hexahydrate.

Example 5

500 gms. of piperazine calcium ethylenediaminetetraacetate and 500 gms. of sucrose were mixed intimately and moistened with methanol containing 10% of water and a small amount of certified food color. The mixture was passed through a No. 16 sieve and dried sharply in an oven at 45° C. until all traces of methanol had been removed.

To the dry granulation thereof, there were added 3% by weight of a solid preparation of raspberry flavoring. A granulation was obtained in which each teaspoonful contains the equivalent of 1 gm. of piperazine hexahydrate. This granulation, when thrown into water, dissolves to produce a palatable liquid.

It will be apparent that the novel salt of this invention is marked by striking ease of manufacture; and that the product is noteworthy for its stability. The ready solubility in water allows for the dispensing thereof in the form of solutions or syrups, or in the form of granulations or in tablets or any other desirable or convenient forms.

It will be understood that the foregoing description of the invention and the examples set forth are merely illustrative of the principles thereof. Accordingly, the appended claims are to be construed as defining the invention within the full spirit and scope thereof.

We claim:

1. As a new composition, the monocalcium monopiperazine salt of ethylenediaminetetraacetic acid having the formula $C_{14}H_{24}N_4O_8Ca \cdot 2H_2O$.

2. As a new composition, the anhydrous form of the salt of claim 1.

3. Method of manufacturing piperazine calcium ethylenediaminetetraacetate, which comprises dissolving equimolar amounts of a member of the group consisting of piperazine and a hydrate thereof, ethylenediaminetetraacetic acid, and calcium in the form of a member of the group consisting of calcium carbonate, calcium hydroxide, calcium oxide and calcium metal in water, and recovering the aforesaid piperazine calcium ethylenediaminetetraacetate from the said solution.

4. Method in accordance with claim 3 wherein the calcium ethylenediaminetetraacetate is recovered from the solution by precipitation.

5. Method in accordance with claim 4 wherein the precipitant is a water-miscible organic liquid which forms a solution with the water wherein the salt is insoluble, said organic liquid being a member of the group consisting of a lower alkanol and acetone.

6. A method in accordance with claim 5 wherein the water-miscible organic liquid is a lower alkanol.

7. A method in accordance with claim 5 wherein the water-miscible liquid is acetone.

8. Method in accordance with claim 4 wherein the salt is recovered from the solution by evaporation thereof to dryness.

9. Method of manufacturing piperazine calcium ethylenediaminetetraacetate, which comprises dissolving equimolar amounts of a member of the group consisting of piperazine and a hydrate thereof, ethylenediaminetetraacetic acid, and calcium in the form of a member of the group consisting of calcium carbonate, calcium hydroxide, calcium oxide and calcium metal in water, and precipitating said piperazine calcium ethylenediaminetetraacetate from said solution by the addition of excess ethanol.

10. Method of manufacturing piperazine calcium ethylenediaminetetraacetate, which comprises dissolving equimolar amounts of a member of the group consisting of piperazine and a hydrate thereof, ethylenediaminetetraacetic acid, and calcium in the form of a member of the group consisting of calcium carbonate, calcium hydroxide, calcium oxide and calcium metal in water and evaporating said solution to dryness.

11. Method of manufacturing piperazine calcium ethylenediaminetetraacetate, which comprises dissolving equimolar amounts of piperazine hexahydrate ethylenediaminetetraacetic acid and calcium carbonate in water, and recovering the piperazine calcium ethylenediaminetetraacetate from said solution by precipitation with ethanol.

No references cited.